April 15, 1952      M. R. HAASE      2,593,023
BALE LOADER

Filed July 22, 1947      5 Sheets-Sheet 4

INVENTOR.
Merlin R. Haase
BY Victor J. Evans & Co.
ATTORNEYS

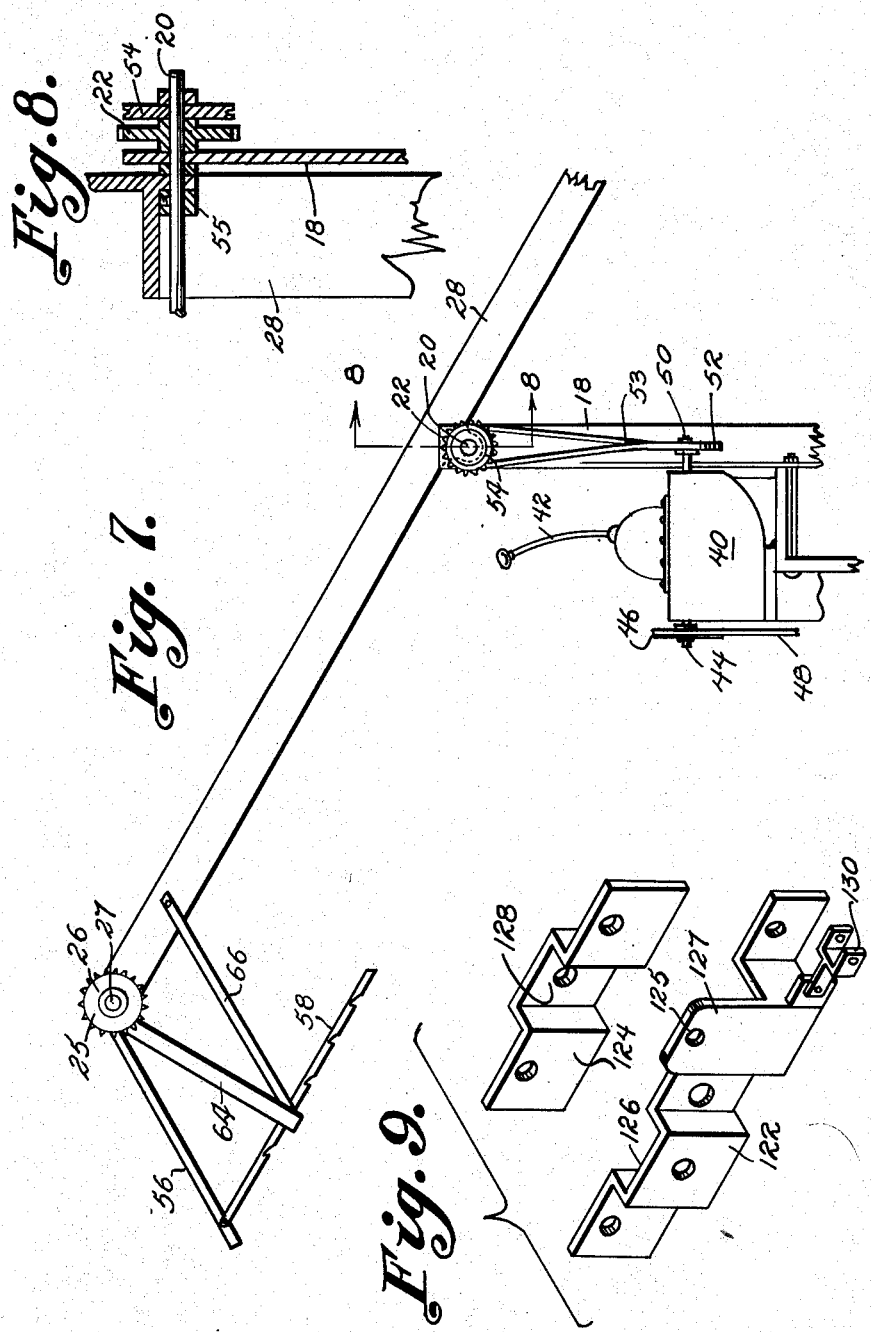

Patented Apr. 15, 1952

2,593,023

UNITED STATES PATENT OFFICE 2,593,023

BALE LOADER

Merlin R. Haase, Berlin, Wis.

Application July 22, 1947, Serial No. 762,606

2 Claims. (Cl. 198—233)

My present invention relates to an improved bale loader of the type especially adapted for use with a tractor from which the operating power is derived and equally fitted for loading bales of hay from the field to a wagon or truck and later removing and elevating the bales from the vehicle to the storage space in the barn.

Generally the bale loader of my invention consists in an endless conveyor, power operated through a take-off from the tractor, means for elevating the conveyor frame to clear obstacles, co-acting means for inverting the position of the conveyor so as to remove bales from a vehicle, and means for reversing the conveyor mechanism. The endless conveyor is fulcrumed near the rear end thereof on the tractor so that the front end may operate near the ground as the pick-up end, or elevated above the rear end, as the discharge end.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Fig. 6 is a sectional view of the guide post and bearing device upon which the conveyor is adjusted vertically.

Fig. 7 is a detail view of the drive means for the conveyor.

Fig. 8 is a sectional view at line 8—8 of Fig. 7.

Fig. 9 is a perspective view of the disassembled bracket structure supporting the guide post.

Figure 1:
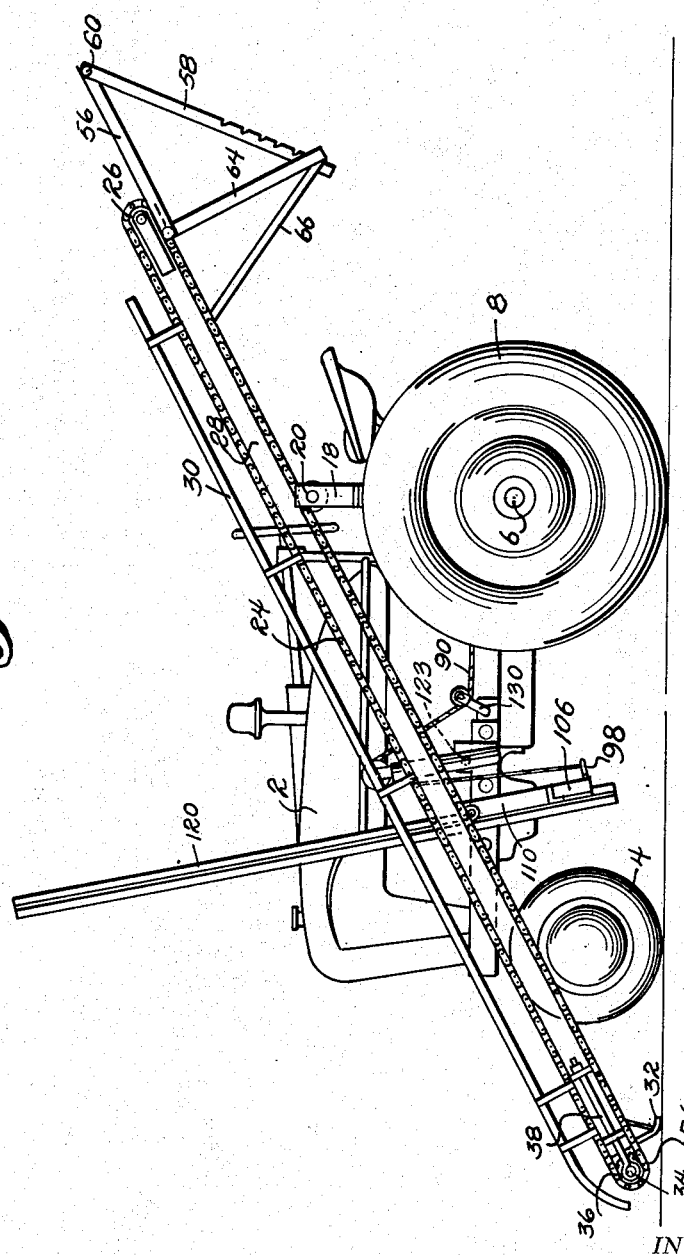
Fig. 1 is a side elevational view of the loader of my invention in position to load bales from the ground.

Referring now to the drawings wherein I have illustrated the present preferred embodiment of my invention I utilize a conventional tractor 2 having front wheels 4, and a rear axle 6 for the rear wheels 8.

The usual differential 10 is incorporated into the rear axle housing 12 and has a take-off shaft 14 and pulley or sheave 16.

A post 18 supported on the rear axle housing 12 journals one end of the shaft 20 which carries a sprocket wheel 22 for driving the conveyor chains 24 which are trained over sprockets 26 on head and tail shafts journaled in the conveyor frame 28. The sprockets on one end of the conveyor are driven by a chain 21 which is trained over a sprocket 22 on the shaft 20 and over a sprocket 25 on a shaft 27 at the head end of the conveyor.

The extended end of the shaft 20 is journaled in a bearing 17 which is supported from the post 18 by a brace 19.

The conveyor is provided with guide rails 30 at the sides which hold bales of hay in position thereon and the picking up end of the conveyor is provided with shoes 32 that prevent the conveyor chains from digging into the ground. The sprockets 26 in the pick-up end of the conveyor are mounted on a tail shaft 34 which is journaled in bearing blocks 36 at the ends of take-up bolts 38 which provides means for adjusting tension on the chains.

A transmission 40 having a gear shift lever 42 is mounted on the tractor and a shaft 44 extended from the transmission is provided with a pulley 46 that is driven by a belt 48 from the pulley 16 on the drive shaft of the tractor. The transmission is also provided with a shaft 50 which is provided with a pulley 52 which through the belt 53 drives the pulley 54 on which shaft 20 is secured by collar 55. Obviously with the transmission mechanism, the direction of movement of the belt 53 and the chains may be reversed. The chains will move in a clockwise direction in Fig. 1, and a counter-clockwise direction in Fig. 2.

A rear platform 56 has a notched bar 58 pivoted thereto at 60 to engage selectively a cross bar between arms 64 braced at 66, so that the position of the platform may be adjusted as desired.

Figure 5:
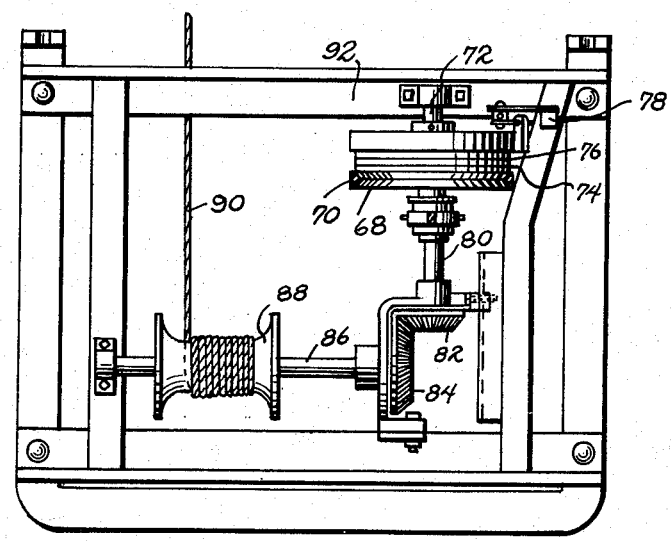
Fig. 5 is a plan view of the power take-off device.

The pulley 68 as shown in Figure 5 is driven by belt 70 from shaft 14 which is secured to shaft 72 and the clutch plates 74 and 76 controlled by pedal 78 permit the selective movement of shaft 80 to dive through beveled gears 82 and 84, the shaft 86 having a wide sheave 88 for cable 90. The clutch and sheave mechanism is supported on frame 92 rearward of the differential housing.

The cable extends forwardly and passes under sheave 94 and over pulley 96 to the ring 98. Pulley 96 is journaled in the bracket 99 in the telescoping pistons 100 and 102 of the hydraulic cylinder 104 mounted pivotally by a bolt 123 in an opening 125 of an extension 127 of the bracket 122 which is secured to the tractor by bolts 129.

The ring 98 is mounted on the lower end of a post 106 of a bracket having an outer post 107 which is connected to the lower end of the post 106 by an arm 109 and the post 106 is provided with arms 110, the extended ends of which are provided with hubs 112 in which rods 114 are mounted. The rods 114 are formed with transversely disposed pins 116 on which balls 118 are mounted as illustrated in Fig. 6 and with the balls 118 positioned in an angle iron post 120 the bracket extended from the post 106 is free to travel upwardly and downwardly in the post.

The post 120 is carried by a bar 111 which is positioned against the outer surface of an extension 128 of a bracket 124 by a bolt 113, the bracket being secured to the side of the tractor frame by bolts 115.

The bar 111 is supported by a bracket 117 which is positioned against the outer surface of an extension 126 of the bracket 122 and bolted to the bracket by a bolt 119.

The bracket 122 is provided with a yoke or fork 130 in which the sheave 94 is journaled and the lower end of the member 120 is provided with a cushioning spring 132 which is secured in position by a cap 134.

With the conveyor in the position of Fig. 1 for picking up bales from the ground, the conveyor is driven as described and to clear an obstacle, the hydraulic cylinder is manipulated to extend the cable and raise the front end. The winding sheave is not operated for such temporary elevation.

Figure 2:
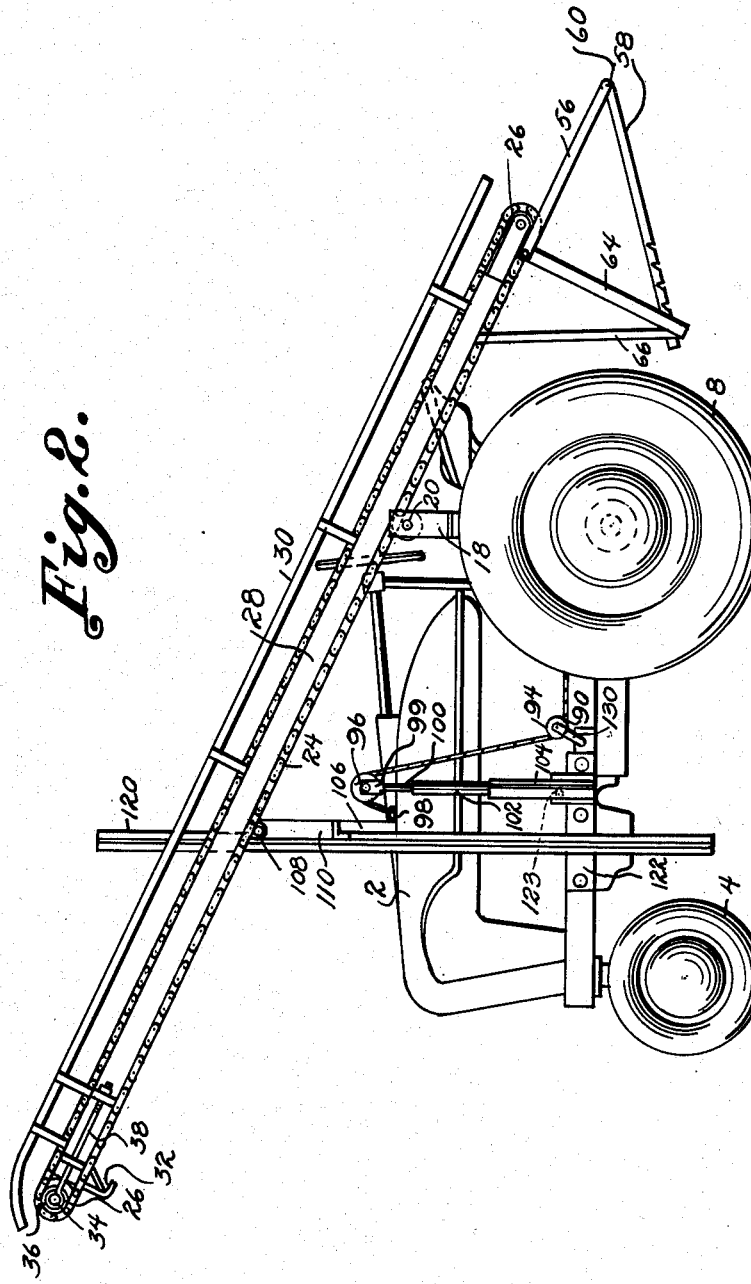
Fig. 2 is a similar view with the loader in position to remove bales from the vehicle.
Figure 3:
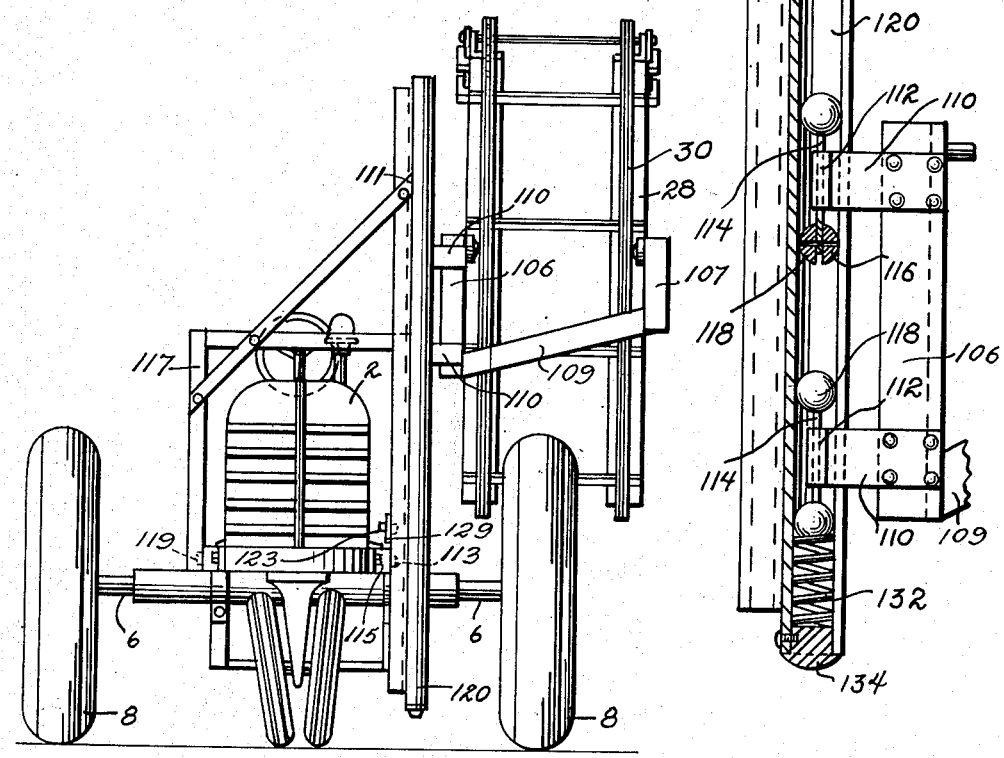
Fig. 3 is a front elevational view.
Figure 4:
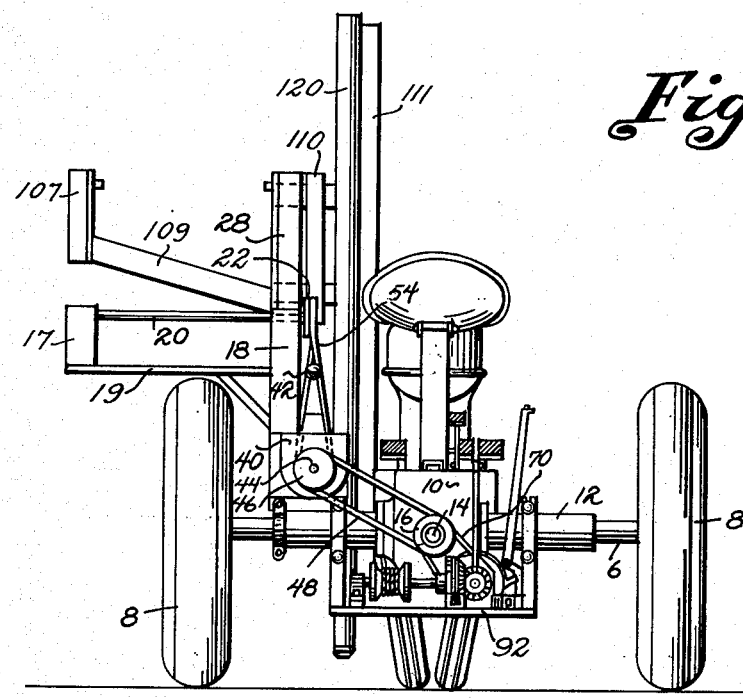
Fig. 4 is a rear elevational view.

However to utilize the loader to remove bales from a vehicle to a storage place the bales of course being positioned inwardly, the clutch is engaged to wind the cable whereupon the frame 106 is elevated as seen in Fig. 2, and to obtain maximum elevation the pistons 100 and 102 are extended. The transmission is then shifted to reverse, and the conveyor will operate counterclockwise.

The loader of my invention may with facility be adapted to any existing tractor and will materially lessen the time and manpower required to pick up, remove, and store bales of hay.

Having thus fully described my invention what I claim as new and desire to secure by Letters Patent is:

1. In a ball loader, the combination with a tractor having a rear axle and a power take-off, of a plurality of posts projecting upwardly from said rear axle, a horizontally disposed shaft supported by said posts, a frame pivotally connected to said shaft, an endless conveyor carried by said frame, guide rails extending longitudinally along said conveyor, shoes arranged on the front of said frame, a chain trained over said frame, means for adjusting the tension of said chain, a transmission device operatively connected to said power take-off for controlling the direction of rotation of said shaft and said chain, a platform adjustably connected to the rear end of said frame, a clutch and sheave mechanism operatively connected to the power take-off and arranged rearwardly of the tractor, said mechanism including a sheave, a cable trained over said sheave, a vertically disposed standard extending upwardly from the tractor, a bracket slidably mounted in said standard and supporting said conveyor, said cable having its front end connected to said bracket for causing pivotal movement of said conveyor, and hydraulic means for adjusting the position of said conveyor.

2. In a bale loader, the combination with a tractor having a rear axle and a power take-off, of a plurality of posts projecting upwardly from said rear axle, a horizontally disposed shaft supported by said posts, a frame pivotally connected to said shaft, an endless conveyor carried by said frame, guide rails extending longitudinally along said conveyor, shoes arranged on the front of said frame, a chain trained over said frame, means for adjusting the tension of said chain, a transmission device operatively connected to said power take-off for controlling the direction of rotation of said shaft and said chain, a platform adjustably connected to the rear end of said frame, a clutch and sheave mechanism operatively connected to the power take-off arranged rearwardly of the tractor, said mechanism including a sheave, a cable trained over said sheave, a vertically disposed standard extending upwardly from the tractor, a bracket slidably mounted in said standard and supporting said conveyor, said cable having its front end connected to said bracket for causing pivotal movement of said conveyor, and hydraulic means for adjusting the position of said conveyor, said hydraulic means including cylinders arranged on the sides of the tractor and adapted to be connected to a source of hydraulic fluid, pistons slidably arranged in said cylinders, and pulleys mounted on the upper ends of said pistons and having said cables trained thereover.

MERLIN R. HAASE.

REFERENCES CITED

The following references are of record in the file of this patent:

UNITED STATES PATENTS

| Number | Name | Date |
| --- | --- | --- |
| 753,888 | Johnson | Mar. 8, 1904 |
| 1,301,642 | Bradney | Apr. 22, 1919 |
| 1,892,495 | Vorthmann | Dec. 27, 1932 |
| 2,033,234 | Estes | Mar. 10, 1936 |
| 2,062,924 | Ochsner | Dec. 1, 1936 |
| 2,093,148 | Hoofnagle et al. | Sept. 14, 1937 |
| 2,251,667 | Ehinger | Aug. 5, 1941 |
| 2,381,892 | Fees | Aug. 14, 1945 |
| 2,400,086 | Hansen | May 14, 1946 |